United States Patent
Goldberg et al.

(10) Patent No.: US 9,639,549 B2
(45) Date of Patent: May 2, 2017

(54) HYBRID OF PROXIMITY AND IDENTITY SIMILARITY BASED DEDUPLICATION IN A DATA DEDUPLICATION SYSTEM

(71) Applicant: INTERNATIONAL BUSINESS MACHINES CORPORATION, Armonk, NY (US)

(72) Inventors: Itzhack Goldberg, Hadera (IL); Neil Sondhi, Budapest (HU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 229 days.

(21) Appl. No.: 14/163,721

(22) Filed: Jan. 24, 2014

(65) Prior Publication Data

US 2015/0213048 A1    Jul. 30, 2015

(51) Int. Cl.
G06F 17/30 (2006.01)

(52) U.S. Cl.
CPC .. G06F 17/30156 (2013.01); G06F 17/30784 (2013.01)

(58) Field of Classification Search
CPC ............. G06F 17/30159; G06F 17/30784
USPC ................................. 707/737, 754
See application file for complete search history.

(56) References Cited

U.S. PATENT DOCUMENTS

| | | | |
|---|---|---|---|
| 8,250,325 B2* | 8/2012 | Holdman | G06F 17/30159 711/162 |
| 8,285,763 B2 | 10/2012 | Accapadi et al. | |
| 8,352,540 B2 | 1/2013 | Anglin et al. | |
| 8,407,190 B2 | 3/2013 | Prahlad et al. | |
| 8,412,848 B2 | 4/2013 | Therrien et al. | |
| 8,484,162 B2 | 7/2013 | Prahlad et al. | |
| 2011/0145207 A1 | 6/2011 | Agrawal et al. | |
| 2012/0151438 A1* | 6/2012 | Bach | G06F 17/3012 707/740 |
| 2012/0185448 A1 | 7/2012 | Mensch et al. | |
| 2013/0110793 A1 | 5/2013 | Chavda et al. | |
| 2013/0151490 A1 | 6/2013 | Chaturvedi et al. | |
| 2013/0159262 A1 | 6/2013 | Jayaraman | |
| 2013/0246372 A1 | 9/2013 | Rao et al. | |

* cited by examiner

*Primary Examiner* — Marc Filipczyk
(74) *Attorney, Agent, or Firm* — Griffiths & Seaton PLLC

(57) ABSTRACT

For a hybrid of proximity and identity similarity based deduplication in a data deduplication, comparing color intensity for additional classification enhancement of colored files grouped together by file coloring where a preferred character is represented for the file coloring using a code selected from a multiplicity of codes that represent a variety of contexts. The original meaning of the preferred character is retained when representing the preferred character for the file coloring by the code selected from the multiplicity of codes.

19 Claims, 8 Drawing Sheets

HYBRID OF PROXIMITY AND IDENTITY SIMILARITY BASED DEDUPLICATION IN A DATA DEDUPLICATION SYSTEM

BACKGROUND OF THE INVENTION

Field of the Invention

The present invention relates in general to computers, and more particularly to a hybrid of proximity and identity similarity based deduplication in a data deduplication system in a computing environment.

Description of the Related Art

In today's society, computer systems are commonplace. Computer systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. An efficient way to alleviate the problem is by using deduplication. The idea underlying a deduplication system is to exploit the fact that large parts of available data are copied, again and again, by locating repeated data and storing only its first occurrence. Subsequent copies are replaced with pointers to the stored occurrence, which significantly reduces the storage requirements if the data is indeed repetitive.

SUMMARY OF THE DESCRIBED EMBODIMENTS

In one embodiment, a method is provided for a hybrid of proximity and identity similarity based deduplication in a data deduplication system using a processor device in a computing environment. In one embodiment, by way of example only, color intensity is compared for additional classification enhancement of colored files grouped together by file coloring where a preferred character is represented for the file coloring using a code selected from a multiplicity of codes that represent a variety of contexts. The original meaning of the preferred character is retained when representing the preferred character for the file coloring by the code selected from the multiplicity of codes.

In another embodiment, a computer system is provided for a hybrid of proximity and identity similarity based deduplication in a data deduplication system using a processor device, in a computing environment. The computer system includes a computer-readable medium and a processor in operable communication with the computer-readable medium. In one embodiment, by way of example only, the processor compares color intensity for additional classification enhancement of colored files grouped together by file coloring where a preferred character is represented for the file coloring using a code selected from a multiplicity of codes that represent a variety of contexts. The original meaning of the preferred character is retained when representing the preferred character for the file coloring by the code selected from the multiplicity of codes.

In a further embodiment, a computer program product is provided for a hybrid of proximity and identity similarity based deduplication in a data deduplication system using a processor device, in a computing environment. The computer-readable storage medium has computer-readable program code portions stored thereon. The computer-readable program code portions include a first executable portion that compares color intensity for additional classification enhancement of colored files grouped together by file coloring where a preferred character is represented for the file coloring using a code selected from a multiplicity of codes that represent a variety of contexts. The original meaning of the preferred character is retained when representing the preferred character for the file coloring by the code selected from the multiplicity of codes.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
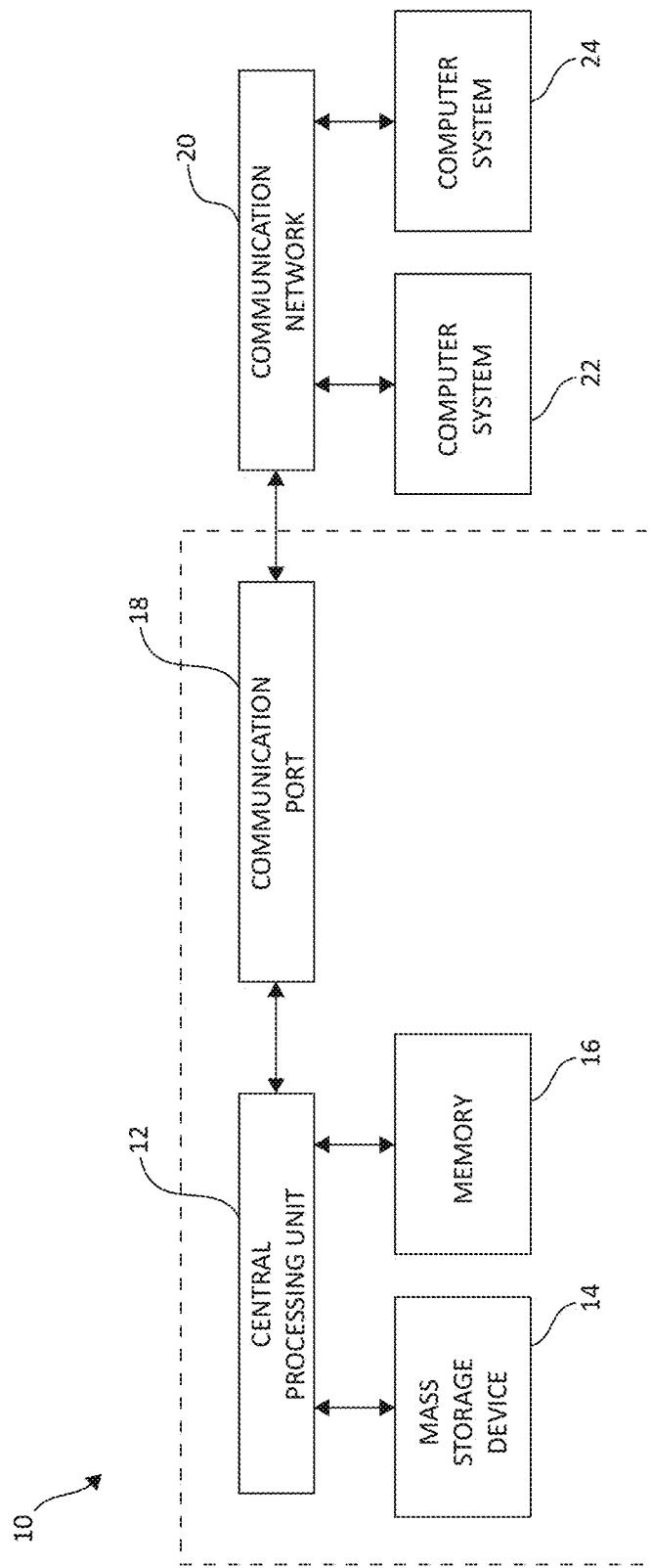
FIG. 1 is a block diagram illustrating a computing system environment having an example storage device in which aspects of the present invention may be realized.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

Deduplication operations per a given file generation assist in finding identical and/or similar data blocks among the given file generations. However, one problem is determining how to recognize, classify, and/or associate incoming backup data with previous generations of the incoming backup data respective files, which may already exist already in the repository, as the data arrives as a stream. Some form of hashes may be used as the files' signatures to recognize, classify, and/or associate incoming backup data with previous generations of the incoming backup data respective files, and/or employ a ContextWare® technique to identify the same. The ContextWare® technology may assist to classify files per the file types. Although a per-type classification allows for a faster search, two files of the same type might have completely different content. Some deduplication solutions opt for ignoring the meta-data of the incoming stream such as: file-type, owners, length etc., because such an information is lost in a multi-stream backup environment. Also, backup applications' headers may be recognized and skipped thereby allowing the user to keep data itself intact and not fragmented (e.g., by using IBM®'s ProtecTIER technology). However, a need exists to use some form of signature to identify similar and/or identical files besides using hashes values as signatures. Indexing and searching of hash values even in a BTREE formation, is costly and computing efficiency is reduced. Providing the means to cluster at a higher level of granularity (beyond the per file type) of related hash values together increases deduplication functionality and performance.

As such, in one embodiment, a solution is provided to cluster at a higher level of granularity (beyond the per file type) of related hash values together by adding cooperative file coloring protocols in a data deduplication system using a processor device in a computing environment. In one embodiment, by way of example only, a preferred character is represented for file coloring in a file using a code selected from a multiplicity of codes that represent a variety of contexts. The original meaning of the preferred character is retained when representing the preferred character for the file coloring by the code selected from the multiplicity of codes. By adding some unique coloring to each file, files which bear similar and/or identical colors may be classified together thereby allowing for matching new input data (colored) with the reference colored data.

For example, assume that a backup data domain is text files (as opposed to compressed or encrypted files and/or binary files). A most popular and/or a preferred characters used by all computing languages is the "space" character. As such, the "space" character (e.g., the most popular character and/or preferred character) is represented for file coloring in a file using a code selected from a multiplicity of codes that represent a variety of contexts. Using the "space" character is just an example as any widely used (e.g., popular and/or preferred) character may be considered for the purpose of file coloring. In one embodiment, the present invention allows an assortment of binary-codes (and/or unused Unicode, and/or any other extended code) to represent a preferred and/or popular character (e.g., the "space" character). The assortment of codes may include at least plane code (e.g., Unicode). In Unicode standard, planes are groups of numerical values (code points) that point to specific characters. Unicode code points are logically divided into 17 planes, each with 65,536 (=$2^{16}$) code points. Planes are identified by the numbers 0 to $16_{decimal}$, which corresponds with the possible values 00-$10_{hexadecimal}$ of the first two positions in six position format (hhhhhh). At least six of these planes have assigned code points (characters), and are named. In one embodiment, about ten percent of the potential space is used. Furthermore, ranges of characters have been tentatively mapped out for every current and ancient writing system (script) the Unicode consortium has been able to identify. While Unicode may eventually need to use another of the spare 11 planes for ideographic characters, other planes remain. Even if previously unknown scripts with tens of thousands of characters are discovered, the limit of 1,112,064 code points is unlikely to be reached. The odd-looking code points limit (it is not a power of 2) is due to the design of UTF-16. In UTF-16 a "surrogate pair" of two 16-bit words is used to encode $2^{20}$ in the planes 1 to 16, in addition to the use of single code unit to encode plane 0. It is not due to Unicode transformation format (UTF) UTF-8, which is designed with a limit of $2^{31}$ code points (32768 planes), and can encode $2^{21}$ code points (32 planes) even if limited to 4 bytes.

Moreover, as part of the Unicode, a basic multilingual plane, supplementary multilingual plane, supplementary ideographic plane, unassigned planes, supplementary special-purpose planes, and/or private use area planes may also be used. For the "Basic Multilingual Plane" each numbered box represents 256 code points. The first plane, plane 0, of the Basic Multilingual Plane (BMP), is where most characters have been assigned. The BMP contains characters for almost all modern languages, and a large number of special characters. A primary objective for the BMP is to support the unification of prior character sets as well as characters for writing. Most of the allocated code points in the BMP are used to encode Chinese, Japanese, and Korean (CJK) characters. The High Surrogates (U+D800 . . . U+DBFF) and Low Surrogate (U+DC00 . . . U+DFFF) codes are reserved for encoding non-BMP characters in UTF-16 by using a pair of 16-bit codes: one High Surrogate and one Low Surrogate. A single surrogate code point will never be assigned a character. For the Supplementary Multilingual Plane, Plane 1, the Supplementary Multilingual Plane (SMP), is mostly used for historic scripts such as Linear B, and is also used for musical and mathematical symbols. For "Supplementary Ideographic Plane." Plane 2, the Supplementary Ideographic Plane (SIP), is used for CJK Ideographs, mostly CJK Unified Ideographs that were not included in earlier character encoding standards. For "Unassigned planes," Planes 3 to 13: No characters have yet been assigned to Planes 3 through 13. Plane 3 is tentatively named the Tertiary Ideographic Plane, but there may not be any characters assigned to it. It is reserved for Oracle Bone script, Bronze Script, Small Seal Script, additional CJK unified ideographs, and other historic ideographic scripts. It is not anticipated that all these planes will be used, given the total sizes of the known writing systems left to be encoded. The number of possible symbol characters that could arise outside of the context of writing systems is potentially large. At the moment, these 11 planes out of 17 are unused. For "Supplementary Special-purpose Plane," Plane 14 (E in hexadecimal), the Supplementary Special-purpose Plane (SSP), may contain non-graphical characters. The first block is for deprecated language tag characters for use when language cannot be indicated through other protocols (such as the xml:lang attribute in XML). The other block contains glyph variation selectors to indicate an alternate glyph for a character that cannot be determined by context. For Private Use Area planes, the two planes 15 and 16, called Supplementary Private Use Area-A and -B (or simply Private Use Area (PUA)) are available for character assignment by parties outside the ISO and the Unicode Consortium, and they are used by fonts internally to refer to auxiliary glyphs, for example, ligatures and building blocks for other glyphs. Such characters will have limited interoperability. Software and fonts that support Unicode will not necessarily support character assignments by other parties.

Using the file coloring, a backup application (e.g., IBM® Tivoli Storage Manager "TSM") adds yet another metadata field, to be called file-coloring, to the database. In one embodiment, prior to sending a file to a storage device (e.g., a Virtual Tape Library "VTL"), the backup application may change all instances of a preferred character (and/or a most popular and/or preferred character, a second most popular and/or preferred character, and/or an nth most popular and/or preferred character) (e.g., all instances of the "space" character) in the respective file to its colored-space. At a time for restoring the file coloring back to the original preferred character, the backup application will search for the file's colored-space and convert the code representing the preferred character back to the preferred character (e.g., plain/stock "space" the users' application expects). By having a cooperative file color-protocol between the backup application and the storage device (e.g., the VTL) allows a data deduplication component on the storage device (e.g., the VTL) to easily focus on the right elements in the repository when looking for duplicates files, data chunks, and/or similarity elements (e.g., hash values generated from a data deduplication operation). It should be noted as the storage device (e.g., the VTL) receive streams of bytes its ability to keep track of the file context is limited. Yet, the present invention provides for the file coloring to be embedded in the data stream and thus, the storage device (e.g., the VTL) is always aware of the file coloring while processing that file data chunks. Moreover, a colored file, where the color is spread across the whole stream, assists the backup system to handle multi-stream embodiments. This is because as each data stream, which may be handled by a different processes and/or threads, the data deduplication and/or backup application still recognizes the file color even at the fragment level, unlike a case where the information (e.g., the ContextWare information) is embedded just at the header level. The file coloring scheme may take various shapes. For example, in one embodiment, the file coloring may have different colors for different servers, different file-colors per the files' owners and/or application type, and/or different file coloring based upon user preferences. It should be noted that even if the number of file coloring options are limited, the ability to color a file simply by file-type assists in the case of multi-streaming as the color is embedded in all file's chunks, regardless of the stream they arrive on.

Thus, in one embodiment, a file is colored in a data deduplication system by representing a preferred character (e.g. whitespace) in a file using a code selected from a variety of codes, where the variety of codes represents a variety of contexts (e.g., metadata, file type, authorship, ownership, and the like.) For example, as relating to the code representing the context, a backup-server may choose to classify files by file types. For instance, all IBM® DB2 files could have one color and all ORACLE® (another data-base type) files can be assigned another color. It is the backup-server prerogative to decide what it is that the backup-server wants to group together. Another probable grouping could be of files by the file's owners such that all of a first users files have one color and a second users files have another color. Such a grouping is beneficial and increases computing efficiency if it is was found that any given user tends to recycle/reuse the same data in the user's own files and as such deduplication efforts should be done on per users' files basis.

Furthermore, the preferred character is represented using the code such that the representation retains an original meaning of the character. In one embodiment, the present invention identifies similarities between data chunks encoded using the aforementioned coding scheme by comparing the metadata represented by the Unicode characters and performing deduplication based on the level of similarity. Thus, in one embodiment, by using the file coloring the need for identifying a start point and/or an end point is eliminated and there is no need to add metadata for the file coloring. Using the file coloring, not only is data bearing the same color is quickly distinguished but the intensity of the file colors is rapidly identified.

Thus, the above description assists deduplicating appliances in marking and then locating similar [candidate] files instead of relying on hash values alone. The a-priori similar files coloring, classification, and/or grouping yields significant improvement over the current state of the art. However, another embodiment described herein pertaining to the present invention, adds yet another dimension to the file coloring processes, which allows for sub-grouping into smaller and more manageable classes (e.g., smaller may be defined by a user, may also be defined according to hardware/software capacities, and/or less than an average size of all files in the storage system, and/or other predefined size according to a users preference) to expedite the deduplication process as well as reduce the chances for hash collisions (because the same hash appearing in two different sub-classes does not cause a data loss).

An addition enhancement is provided instead of relying on hash values, by providing a hybrid of proximity and identity similarity based deduplication. In other words, not only are the file colors of data blocks distinguished, but the intensity of the file colors are identified to improve the classification of colored files. For example, in data deduplication for data storage, a multistep similarity search process is employed and first looks and/or searches for a dominant characteristic (e.g., file color of a colored file, which coloring may be considered a first classification), and then second, looks and/or searches for associated characteristics (e.g., file color intensity and distribution of colors, which may be considered a second classification and/or an enhanced classification). The color intensity is used to improve the classification of files within a given file color group (e.g., the first classification).

For example, when employing the file coloring, dominant color(s) are first analyzed and then the intensity and/or distribution of the colors are then analyzed. A signature (e.g. the unique file color) is utilized to identify similar/identical files so that similar/identical files may then be classified together. In file coloring, unique binary representations in a file (e.g. the SPACE character) are replaced with another binary code (e.g. unused Unicode or extended code) to represent the SPACE character while at the same time also being used for classification of the file (e.g. giving the file a color as a signature for similarity classification.)

It should be noted that the present invention is indifferent to the semantics of the data, but only interested in the data stream file color and the color intensity for sub-classification of data streams, which happen to share the same color. In so doing, similar data streams are identified in order to improve the deduplication-hit rate. Efficiency is increased in the deduplication process and is unaware of the files' type since the present invention focuses on the attributes common to all files, especially text files, which are the best candidates for deduplication). Measuring the intensity of the colored files enhances the classification of data files that were group by the colors of the data files through comparison of the color intensity of the colored files. The color intensity is located and/or identified as reflected by similar distributions of a given color, and then the data streams are grouped and/or classified into sub-groups according to their color intensity. The color intensity is used to improve the classification of files within a given color group.

Using "gross" data, such as character frequencies for similarity test purposes, is not feasible because even the smallest change in a file impacts the respective counters and hinders the ability to use them for similarity checking Worse still, completely different files may have similar characters distributions. However, combining the "gross" classification with the finer, exact, and/or distinct hash fingerprints yields this new hybrid solution as described herein.

As such, the present invention uses file-coloring to assist the process of finding similar data chunks, which are based not solely on hash signatures. The present invention assists in clustering potentially similar chunks together and in doing so, creates an hybrid solution of proximity—similarity and identity (similarity put together)—and facilitates an increased efficiency of a deduplication process as well as minimize the chances for hash collisions that could lead to data loss. A hybrid of proximity and identity similarity based deduplication is used in a data deduplication system using a processor device in a computing environment. The file colors and/or the color intensity is compared for additional classification enhancement of colored files grouped together by file coloring where a preferred character is represented for the file coloring using a code selected from a multiplicity of codes that represent a variety of contexts. The original meaning of the preferred character is retained when representing the preferred character for the file coloring by the code selected from the multiplicity of codes.

A frequency distribution map of characters may also be built. However, instead of only doing so as a basis for using the frequency distribution map of characters to build hash values that are less likely to change if minor changes in the data do happen, the distribution of the various characters that appear in the data are used as the basis for the suggested approximate hash. The data will be partitioned into relatively small chunks "C" of fixed or variable length, with (average) size of about 8-16 Kilobytes (K). Each such data chunk will be analyzed as to the distribution of the bytes forming it and the frequencies of the data chunks. The sequence of different bytes is defined according to the order by the byte's frequency of occurrence in the chunk, as the c-spectrum of C, and the corresponding sequence of frequencies as the f-spectrum of C. In addition, the sequence of different byte pairs are considered, and ordered by the different byte pair's frequency of occurrence in the chunk, and also calls the sequence of different byte pairs of the p-spectrum of C. The suggested approximate hash function ah(C) will be a combination of certain elements of these spectra. The reasoning behind the decision of relying on these color distributions (e.g., combination of certain elements) is that on the one hand, the color distributions behave like fingerprints thereby minimizing the risk that different chunks will exhibit the same distributions. On the other hand, small perturbations in the data will often have no impact, or just a minor impact on the corresponding spectra, which is the goal the present invention achieves in designing an approximate hash.

The essence of the solution described herein is based on rolling hash calculations which stand on three pillars, where the major challenge in the design of an approximate hash function is finding the right balance between the following three competing criteria: 1) Uniformity: the approximate hash function should yield a distribution of values as close as possible to uniform so as to minimize the number of collisions (false matches); 2) Simplicity: the approximate hash function should be easy and fast to calculate; and 3) Sensitivity: small changes in the chunk should not, and/or only slightly, affect the corresponding approximate hash value. Frequency alone cannot be used for similarity approximation but, frequency and intensity of the character distribution (e.g., file coloring) can allow for gross classification of data chunks, which is lost when the more elaborate and sophisticated approximate-hash is used. The file-color based technique requires a single processing of the data to come up with the chunk's color-attributes. The file-color technique does not use frequency distribution as means to another end but rather as an end by itself.

As the term "color" appears often throughout the description, an analogy from the painting world might be in order in order to more clearly describe the present invention. Consider a scenario where a museum that owns several original Van Gogh paintings is looking for new [e.g., no copies] pieces to purchase. Assume that the three Van Gogh paintings (e.g., paintings of woman head), which may appear to be similar not only because the woman may be the same but also because the technique used in each painting by the painter Van Gogh is the same. Being able to capture the gross similarities among these paintings is the crux of the color-intensity identification, which is similar to using the hash technique/color-intensity identification as described herein. For example, continuing with the painting analogy, the museum naturally records all of the museum's original paintings and keeps an index of the unique signatures (e.g., up to 4) of each of the paintings the museum posses. In this way, the museum can check every "new" offer for purchase of Van Gogh paintings by the signatures and instantly determine whether the paintings are even similar. A more thorough test is required to establish the authenticity of a piece that passed the earlier similarity test. The detailed comparison is done (in the case of the painting) by comparing the actual fractions of the two paintings to one another or (as done by other vendors), by comparing the respective signatures of painting's fractions, to see maybe if it is a new piece of work, or even worse, a poor copy of the original painting. Once a verdict is reached it is final and the museum may decide whether to buy the new painting/work for the purchase price, or if the painting was found to be a copy, the museum may decline the offer, and save money and storage space too. Keeping "similarity" signatures requires a lot of work up front and expertise in identifying the few best signatures.

Also, the museum does not spend its monetary resources up front therefore only keeping brief descriptions of each of its paintings. The brief descriptions might be the same for a number of paintings (e.g., Van Gogh) paintings. For every "new" painting, the paintings brief description is compared to the assortment of relevant painting descriptions on record. Upon, finding similar descriptions, the museum expert resorts to either the thorough/prudent comparison process, or opt for a signature based comparison method.

Using this analogy as a backdrop to describe the present invention, the file-coloring technique, as described herein, may require comparing a number of similar descriptions against a new piece of data. The file-coloring operation generally characterizes data (e.g., the painting in the analogy above) according the number of colors used and the intensity (e.g., the brief description of the painting in the analogy above) of those colors for yielding a more robust similarity test system. It should be noted that similar tests by definition may not lead to a data loss where a piece of data is considered identical to new data arriving at the system (even if the piece of data is not identical to the new data) since a thorough test is conducted to ensure the identity of respective data blocks.

A similarity test for identifying data chunks may be evaluated according to four categories. 1) Category 1: a similarity test that yields a percentage of TRUE/TRUE results, where similar chunks are found to be similar (True) and there is one-hundred percent (100%) similarity result (True) (e.g., there is no situation where similar chunks are missed and the best fit should be the most likely to be used). 2) Category 2: a similarity test that yields a percentage of TRUE/FALSE results, where data chunks are tested to be similar (True) but, a more thorough examination of the data chunks reveals the data chunks are not similar (False). Having too many TRUE/FALSE incidents might slow the similar chunks finding process but it is less severe than discarding a similar chunk. 3) Category 3: a similarity test that yields a percentage of FALSE/TRUE results, where the similarity test failed to recognize the data chunks similarity (False) but in reality the data chunks are similar (True). Failing in this category will result is less than optimal deduplication as the duplicate data chunks will be created instead of referencing earlier ones. 4) Category 4: a similarity test that yields a percentage of FALSE/FALSE results, where data chunks are found to not be similar (False) and indeed the data chunks are not similar (False).

The data chunks' colors are used as a means for identifying and then comparing the data chunks for similarity. The data chunk color is an accumulation of vastly used characters within the data chunk, and the chunks colors' color list and/or color map may be used for similarity comparison. The hybrid-based similarity test leverages the initial color grouping; category 1. The hybrid color/hash-based similarity grouping expedites the cases of category 1: TRUE/TRUE hit results where all similar/identical chunks are identified and found. The color based similarity grouping allows flattening B-TREE indexes, and then searching and comparing similarity-hash values, and/or identifying hash values only of plausible data chunks. Using the file-coloring for testing the similarity of data chunks allows for hierarchical structure such that if an alleged similar chunk is found to be a false candidate, than other chunks in the same proximity, according to their attributes, may be used. Such is different than using hash values alone where the hash value do not have any inherit description of the data they represent and there is no probable relation to other possible similar data chunk candidates.

For executing a hybrid proximity and identity of similarity-based deduplication in a data deduplication, the color intensity of colored files are compared for additional classification enhancement of the colored files that are grouped together by file coloring. The files may be colored by representing by a preferred character for the file coloring by using a code selected from a multiplicity of codes that represent a variety of contexts. The original meaning of the preferred character is retained when representing the preferred character for the file coloring by the code selected from the multiplicity of codes. A multistep similarity search operation may be used for searching first for a dominant characteristic of the colored files and searching second for associated characteristics of the of colored files. The dominant characteristic may include a dominant color and the associated characteristics may include at least color intensity and distribution of colors to the colored files. A signature may be used for identifying similarly colored files for classifying similarly colored files together.

The file coloring of data chunks may be embedded in data streams. The file coloring may include shapes, colors for one of the servers, file owners, and a applications. The colored files may be are compared by comparing vectors of at least two colored files. The color intensity is used for comparing the colored files by measuring a ratio between an actual average distance of the colored file divided by an optimal average distance of the colored file for comparing distribution of colors in data chucks of the colored files. The optimal average distance is equal to a file size divided by a total number of the file colors that appear within the colored files. The color intensity includes a distribution pattern characteristic of the file coloring. The similarities are identified between data chunks of the colored files using the color intensity. The data chunks identified as having a similar color intensity are then classified as similar data chunks.

A file color group contained in at least one of a multiplicity of file color permutations is identified for incoming data chunks. Generally, the permutations include the act of permuting (rearranging) objects or values (e.g., file colors of colored files or the colored files themselves). Informally, a permutation of a set of objects is an arrangement of those objects into a particular order. For example, there are six permutations of the set {1,2,3}, namely (1,2,3), (1,3,2), (2,1,3), (2,3,1), (3,1,2), and (3,2,1). As another example, an anagram of a word is a permutation of its letters. The number of permutations of n distinct objects is "n factorial" usually written as "n!", which means the product of all positive integers less than or equal to n. The incoming data chunks are compared to existing data chunks in the one of the multiplicity of file color permutations, and the incoming data chunks are compared to existing data chunks in one of the multiplicity of file color permutations or to an alternative one of the multiplicity of file color permutations if all of the incoming data chunks fail to be substantially similar (e.g, at least 50 percent or more) to the existing data chunks.

The color intensity may be calculated by measuring a ratio between the actual average distance of a color of the colored file divided by the calculated average distance (e.g., an optimal average distance) of the color of the colored file. The calculated average distance of the colors of the colored file assumes the color of the colored file is evenly distributed in the colored file. In one embodiment, the present invention may set as the preferred character one of a most used character, a second most used character, and an nth most used character for the file coloring, arrange the colored files according to one of a multiplicity of first file color permutations, arrange the colored files according to one of a multiplicity of second file color permutations, classify incoming data chunks into both the multiplicity of first file color permutations and the multiplicity of second file color permutations, and/or compare the incoming data chunks to existing data chunks using at least one of the multiplicity of first file color permutations and the multiplicity of second file color permutations.

The color intensity may be used to determine whether the file color is clustered in a localized region of the data file and/or if the file color randomly dispersed in the data file (or other distribution pattern. If the calculated-average-distance is larger than the actual average-distance then the color is identified as being clustered in the data file and not evenly spread.

A data file, data chunk, just a bunch of characters, and/or letters without any additional semantic pattern is analyzed for measuring color intensity, without looking for any particular pattern. Thus a "quick-glance-taking" approach is used for identifying similarities and proximity of data chunks in a deduplication system. The hybrid based technique file coloring described herein is used to improve and fine-tune the hash's clusters following on the heels of the induced file coloring also described herein. The scarcity of the data chunks' colors is the key element which determines the actual depth and/or width of the tuples' sub-trees. (A tuple may be generally defined as a sequence (or ordered list) of 'n' elements, where is 'n' is a non-negative integer. An n-tuple is defined inductively using the construction of an ordered pair.

Each tuple may host the respective data chunks, which are characterized by the tuple. The tuples may be ordered or not ordered. In an ordered tuple the weights of the file colors are important. The weights may be predefined and/or automatically calculated. For the non-ordered tuple, a file color is merely part of a tuple but the weight of the color within that tuple is not recorded. This approach for the non-ordered tuple does take into account the possibility that changes may occur in the data chunks and may cause the color order to change, which is more realistic even though it extends the number of chunks per tuple it. In the case of the ordered-tuple a need may exist to actively search number of related tuples before exhausting the search for similar chunks. The hybrid approach described herein repeatedly uses the hashes, and groups the hashes for increased processing efficiency while reducing the search time. In one embodiment, a maximum number of color-based trees used is 256!/(256−n)! if the color order within a tuple is ignored, or when the color weights in the tuple are important (as determined by a user and/or application) the maximum number of color-based trees used is 256!/((256−n)!*n!). The "256!" is 256 factorial divided by (256 minus n) factorial, where "n factorial" usually written as "n!", as mentioned above, and 256!/((256−n)!*n!) is 256 factorial divided by ((256 minus n) factorial) multiplied by n!. Despite these large numbers the colored-based trees are expected to be sparse and radically smaller in number.

The order by which the chunks should be compared is two fold. First, vectors of two chunks colors' are compared if the majority of the colors do appear in both chunks. Second, the intensity of the colors that is measured and/or reflected by the ratio between the actual average distance divided by an optimal average is used to compare the nature of the color distribution in the respective chunks. The actual average distance is the actual distance of the colored file from end to end. The optimal average distance is equal to a file size divided by a total number of the file colors that appear within the colored files, wherein the color intensity includes a distribution pattern characteristic of the file coloring (e.g., file size divided by the number of color appearances in a file). Data chunks with comparable color intensity are more likely to be similar than those that have different level of color intensity (of character distribution pattern).

Turning now to FIG. 1, exemplary architecture 10 of a computing system environment is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
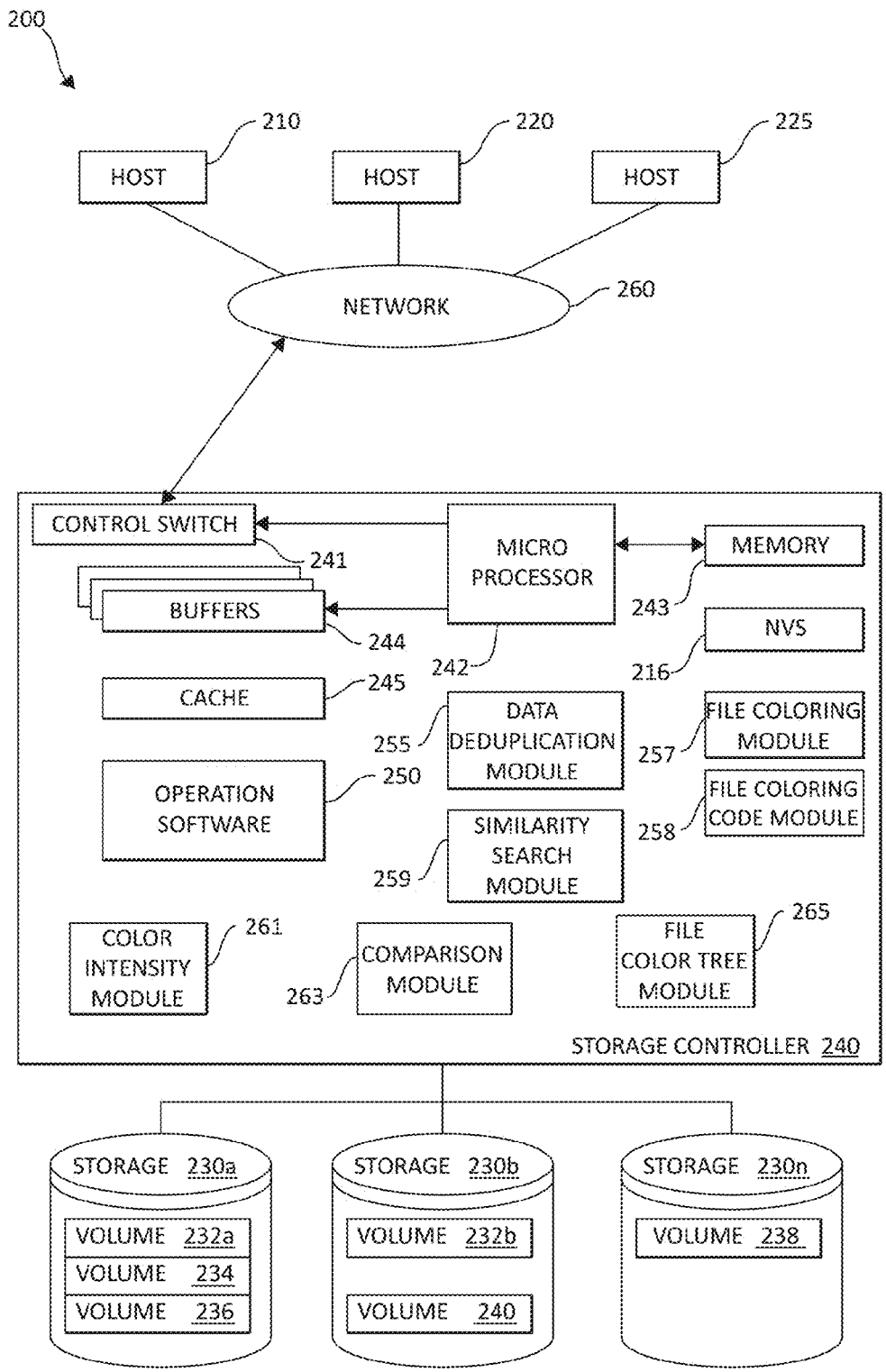
FIG. 2 is a block diagram illustrating a hardware structure of data storage system in a computer system in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. In one embodiment, by way of example only, a data storage system 200 may be implemented as IBM® Protec-TIER® deduplication system TS7650G™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adaptor 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216. It is noted that in some embodiments, storage controller 240 is comprised of multiple processing units, each with their own processor complex and system memory, and interconnected by a dedicated network within data storage system 200. Storage 230 (labeled as 230a, 230b, and 230n in FIG. 3) may be comprised of one or more storage devices, such as storage arrays, which are connected to storage controller 240 (by a storage network) with one or more cluster hosts 210, 220, and 225 connected to each storage controller 240.

In some embodiments, the devices included in storage 230 may be connected in a loop architecture. Storage controller 240 manages storage 230 and facilitates the processing of write and read requests intended for storage 230. The system memory 243 of storage controller 240 stores program instructions and data, which the processor 242 may access for executing functions and method steps of the present invention for executing and managing storage 230 as described herein. In one embodiment, system memory 243 includes, is in association with, or is in communication with the operation software 250 for performing methods and operations described herein. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described in herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include a data duplication module 255, a file coloring module 257, a file coloring code module 258, and a similarity search module 259, a color intensity module 261, and a comparison module 263. The data duplication module 255, the file coloring module 257, the file coloring code module 258, and the similarity search module 259, the color intensity module 261, and the comparison module 263 may work in conjunction with each and every component of the storage controller 240, the hosts 210, 220, 225, and storage devices 230. The data duplication module 255, the file coloring module 257, the file coloring code module 258, and the similarity search module 259, the color intensity module 261, and the comparison module 263 may be structurally one complete module or may be associated and/or included with other individual modules. The data duplication module 255, the file coloring module 257, the file coloring code module 258, and the similarity search module 259, the color intensity module 261, and the comparison module 263 may also be located in the cache 245 or other components.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, data for control, cache 245 for temporarily storing (buffering) data, and buffers 244 for assisting the cache 245 to read and write data, a control switch 241 for controlling a protocol to control data transfer to or from the storage devices 230, the data duplication module 255, the file coloring module 257, the file coloring code module 258, and the similarity search module 259, in which information may be set. Multiple buffers 244 may be implemented with the present invention to assist with the operations as described herein. In one embodiment, the cluster hosts/nodes, 210, 220, 225 and the storage controller 240 are connected through a network adaptor (this could be a fibre channel) 260 as an interface i.e., via at least one switch called "fabric."

In one embodiment, the host computers or one or more physical or virtual devices, 210, 220, 225 and the storage controller 240 are connected through a network (this could be a fibre channel) 260 as an interface i.e., via at least one switch called "fabric." In one embodiment, the operation of the system shown in FIG. 2 will be described. The microprocessor 242 may control the memory 243 to store command information from the host device (physical or virtual) 210 and information for identifying the host device (physical or virtual) 210. The control switch 241, the buffers 244, the cache 245, the operating software 250, the microprocessor 242, memory 243, NVS 216, data duplication module 255, the file coloring module 257, the file coloring code module 258, and the similarity search module 259, the color intensity module 261, and the comparison module 263 are in communication with each other and may be separate or one individual component(s). Also, several, if not all of the components, such as the operation software 250 may be included with the memory 243. Each of the components within the devices shown may be linked together and may be in communication with each other for purposes suited to the present invention. As mentioned above, the data duplication module 255, the file coloring module 257, the file coloring code module 258, and the similarity search module 259, the color intensity module 261, and the comparison module 263 may also be located in the cache 245 or other components. As such, the data duplication module 255, the file-coloring module 257, the file coloring code module 258, and the similarity search module 259, the color intensity module 261, and the comparison module 263 maybe used as needed, based upon the storage architecture and users preferences.

Figure 3:
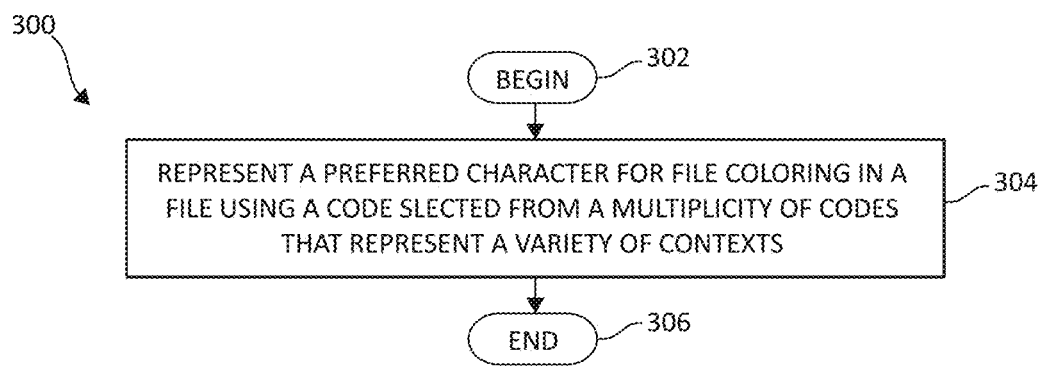
FIG. 3 is a flowchart illustrating an exemplary method for adding cooperative file coloring protocols in a data deduplication system in which aspects of the present invention may be realized.

Turning now to FIG. 3, a flowchart illustrating an exemplary method 300 for adding cooperative file coloring protocols in a data deduplication system in which aspects of the present invention may be realized, is depicted. The method 300 begins (step 302). The method 300 represents a preferred character for file coloring in a file using a code selected from a multiplicity of codes that represent a variety of contexts (step 304). The original meaning of the preferred character is retained when representing the preferred character for the file coloring by the code selected from the plurality of codes. The method 300 ends (step 306).

Using the file coloring, the same-color files together may be clustered together. By providing a means, at a higher level of granularity (beyond the per file type) of related hash values, to cluster files together by adding cooperative file coloring protocols in a data deduplication system assists to increase the functionality and performance of the deduplication system. The preferred character is represented for file coloring in a file using a code selected from a multiplicity of codes that represent a variety of contexts. The original meaning of the preferred character is retained when representing the preferred character for the file coloring by the code selected from the multiplicity of codes. By adding some unique coloring to each file, files which bear similar and/or identical colors may be classified together thereby allowing for matching new input data (colored) with the reference colored data. The embodiments described herein are transparent to the servers and users' applications and provides significant advantages for increasing the efficiency in data deduplication in the adoption of such techniques. If a higher-level application adheres to a new file-color protocol/standard it will assist the deduplication operation identify similar files (those that originated from the same file), as the file-color will be retained throughout the files' life time.

For example, consider the example above, where the "space" character is the preferred choice for file coloring purposes. In the case of text files, a few assumptions are revealed: 1) the "space" character is expected to be the most used character in any text file, and 2) the distribution and/or usage of the "space" characters are expected to be evenly distributed across the entire file, and thus is likely to be found in any reasonable data chunk of the respective file. In the case of binary files the most "popular" character may be any arbitrary character. If indeed, in one embodiment, it is possible to identify a most popular character in a binary file (e.g., a character that its number of appearances in a file is significantly larger by comparison than any other character and also that is evenly spread a cross the file) then that character can be considered the file color, without resorting to any color table standard. The backup storage device (e.g., the VTL) may then cluster all files according to the data chunks/files inherent colors in clusters so, that the search for duplicates can be carried out at least first, against the file's respective color group, and if and only if, that search doesn't produce a most similar match then to look for matches in other clusters.

Moreover, if it is still desired to use a color table for binary files as is done for text files then finding the right color for a "binary" file (where there is no way to know before hand which character is not used) might require an extra phase to ensure that the new-color is indeed available. In other words, in the case of binary files, no particular pattern and/or character is invalid. Thus, it is required to traverse the entire file and map all used-up patterns and only those patterns that are not found may be used as the file-color by changing the most popular character with the unused pattern that turns into the file color. The case might even be that over the lifetime of a file the file's colors changes because a character that was previously "free" turned to be taken in one of its generations. In other words, the file colors may change because a pattern that was not included in the binary file's early generations can all of a sudden appear, and as such, force a need to find a new unused pattern. Such a scenario diminishes the effectiveness of the specific-file-color as old generations will not be matched with newer generation of the same color. If a given pattern (which was not found in the original binary file) appears in the new file data, then the pattern that was used as a color cannot be used as color anymore and new color has to be found from the still unused patterns. The possibility of coloring binary provides for completeness for file coloring. Another approach to address the possibility of file-color change is to create a class of related colors so that if a given color is not available anymore the next color for the file will be picked from the pre-configured color class. For example, the colors Black and Blue may be assigned in the same class (e.g., colors with B being their first character are assigned to a class). If the original file-color was Blue and then the file color was found to turn into a valid data and as such not available, then the new color would be changed to Black. Upon, looking in a data repository, the computing system will look plausibly first for files with Blue color and then with Black color. Another variation of the file-coloring may be multi-level where the prefix of the "color" classifies the file type (such as DB2 or WORD-PRO and the like) and the rest of the color will be allowed to associate the file with particular user/owner and/or file-name and, so on and so forth.

Figure 4:
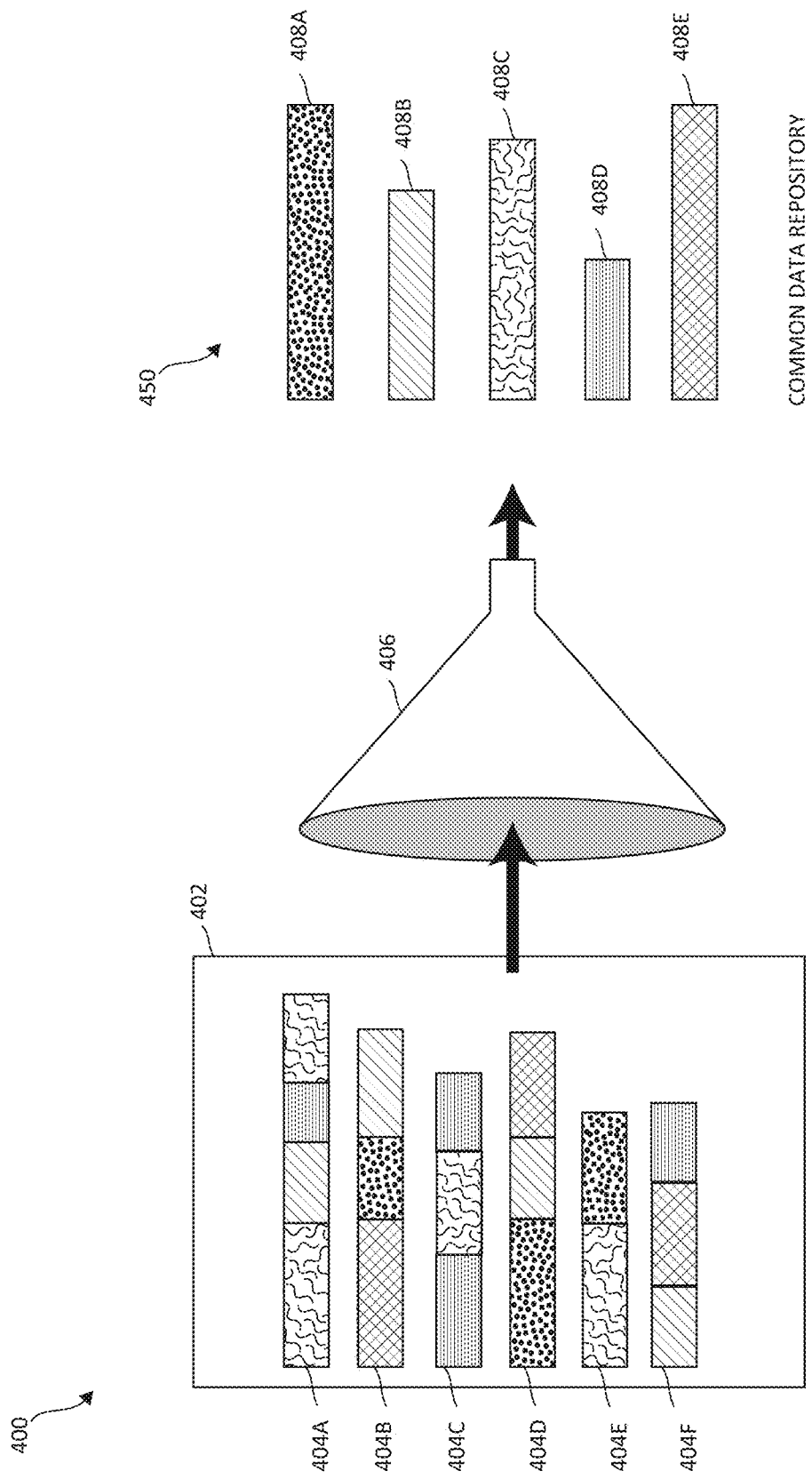
FIG. 4 is a block diagram illustrating a data deduplication system with added cooperative file coloring protocols in in which aspects of the present invention may be realized.

FIG. 4 is a block diagram illustrating a data deduplication system with added cooperative file coloring protocols in which aspects of the present invention may be realized. FIG. 4 illustrates the deduplication operations reducing the amount of duplicate data being backed up and then stored by identifying and eliminating common data in and across the backup storage system using the file coloring protocols. Files in a backup job application 402 are illustrated with six data streams 404 (shown in FIG. 4 as 404A-F). Each data stream 404 includes various data chunks having a preferred character represented for file coloring for a file using a code selected from a multiplicity of codes that represent a variety of contexts. The original meaning of the preferred character is retained when representing the preferred character for the file coloring by the code selected from the multiplicity of codes. By adding some unique coloring to each file and embedding the file coloring in the data streams for each data chunk, files which bear similar (e.g., same prefix pattern are considered as similar bearing in mind that deduplication is most probable between various generation of the same file and not various generations of similar files) and/or identical colors may be classified, using the classification module 406 together, with the classified results seen in the common data repository 450, thereby allowing for matching new input data (colored) with the reference colored data. In the common data repository 450, data chunks 408A having a first selected file coloring are matched and stored together with other similarly file colored data chunks 408A from each of the data streams 404A-F having the first selected file coloring. In the common data repository 450, data chunks 408B having a second selected file coloring are matched and stored together with other similarly file colored data chunks 408B from each of the data streams 404A-F having the second selected file coloring. In the common data repository 450, data chunks 408C having a third selected file coloring are matched and stored together with other similarly file colored data chunks 408C from each of the data streams 404A-F having the third selected file coloring. In the common data repository 450, data chunks 408D having a fourth selected file coloring are matched and stored together with other similarly file colored data chunks 408D from each of the data streams 404A-F having the fourth selected file coloring. In the common data repository 450, data chunks 408E having an nth selected file coloring are matched and stored together with other similarly file colored data chunks 408E from the other data streams having the nth selected file coloring. Thus, by the file coloring, the ability to color a file simply by file-type assists in the case of multi-streaming 404A-F as the color is embedded in all files' chunks 408, regardless of the data stream 404 they arrive on. Moreover, each of the data chunks assembled together from each separate data stream based on the file coloring may also be matched and stored with existing files having similar file coloring that have previously been stored. By identifying similarities of the file coloring between chunks of data encoded using the aforementioned coding scheme by comparing the contexts represented by the Unicode characters the files/data chunks 408 may be deduplicated based on the level of similarity of the file coloring.

Figure 5:
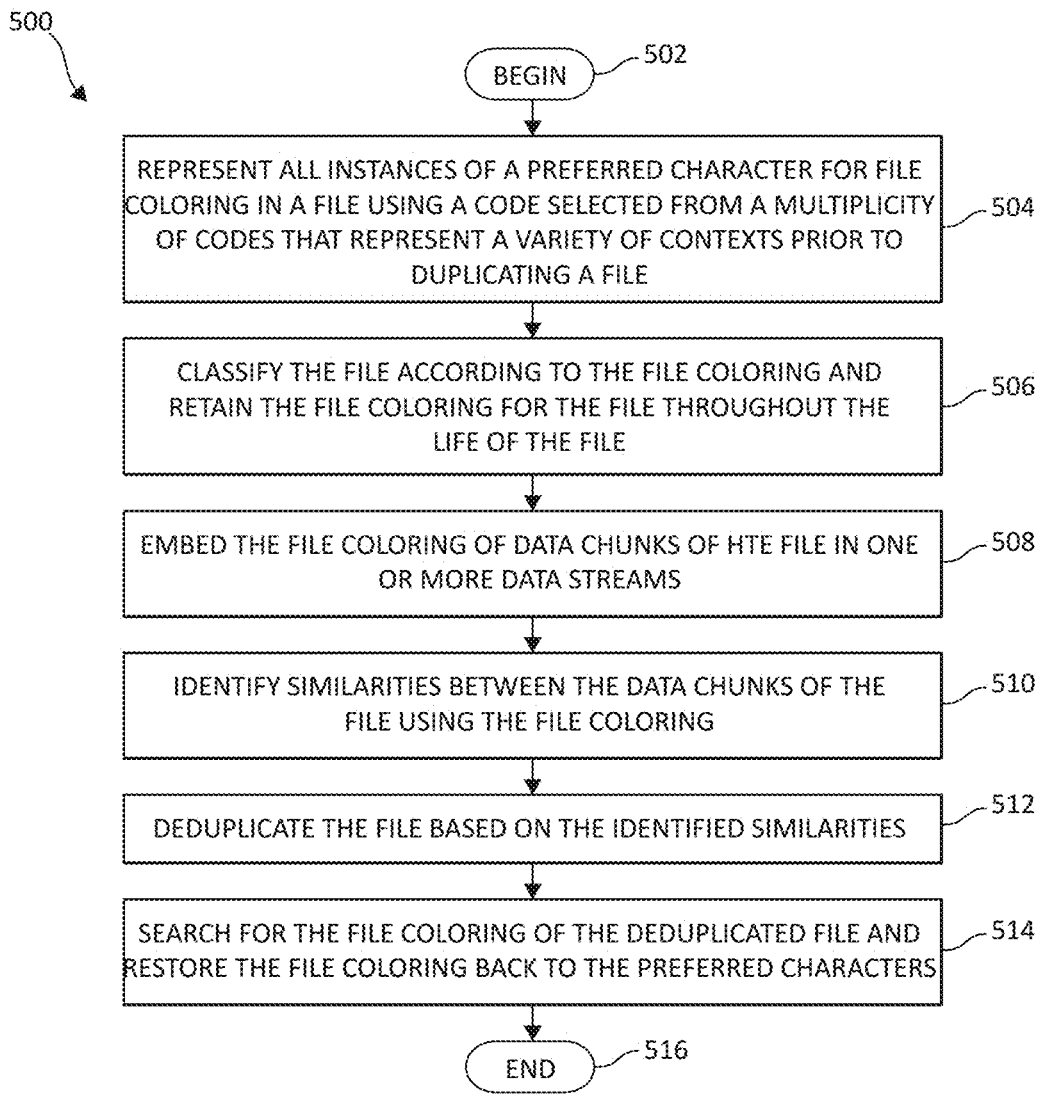
FIG. 5 is a flowchart illustrating an exemplary alternative method for adding cooperative file coloring protocols in a data deduplication system in which aspects of the present invention may be realized.

FIG. 5 is a flowchart illustrating an exemplary method 500 for adding cooperative file coloring protocols in a data deduplication system in which aspects of the present invention may be realized. The method 500 begins (step 502). The method 500 represents all instances of a preferred character for file coloring in a file using a code selected from a multiplicity of codes that represent a variety of contexts prior to deduplicating a file (step 504). The method 500 classifies the file according to the file coloring and retains the file coloring for the file throughout the life of the file (step 506). The method 500 embeds the file coloring of data chunks of the file in one or more streams (e.g., if the data chunks of a file are sent in different streams the file colors for the data chunks are embedded in each data stream) (step 508). Similarities between the data chunks of the file are identified using the file coloring (step 510). The method 500 deduplicates the file based on the identified similarities (e.g., deduplicates the file after locating the file based on the file coloring (step 512). The purpose of coloring a file is to allow the system to locate quicker the relevant files/data in a repository where common pieces are likely to be found (using hash values). At the time the file needs to be restored, the method 500 searches for the file coloring of the deduplicated file and restores the file coloring back to the preferred characters (step 514). The method 500 ends (step 516).

At this point, it should be noted that the file coloring further adds an extension to the similarity hash that is generated as a part of a deduplication operation (e.g., IBM of ProtecTIER deduplication). In other words it is possible there could be multiple backup servers/programs used against the repository, and a file color might bear the file color and/or file name of the program which actually did the backup so as to look for other data in the repository backed up by that particular server as it is not likely that the very data is backed up by different services. For example, during the deduplication operation (e.g., IBM's ProtecTIER deduplication) distinguishing characteristics (e.g., similarity elements) may be generated. Thus, these distinguishing characteristics (e.g., similarity elements) may be tagged with a least significant "coloring" and/or whatever size is deemed necessary. The file coloring codes the data source and/or format. In the examples above, file system versus network data management protocol (NDMP) backup and client that the backup originated from. Then, when new data arrives and the similarity search structure is searched for the new data's most similar data stored in the similarity search structure (e.g., a similarity index) and this file coloring is used as a tie breaker in the event that an input distinguishing characteristic matches more than one repository (existing) distinguishing characteristic. In this way, a new NDMP backup would favor deduplicating using an older NDMP Network Data Management Protocol backup as its reference rather than a file system backup of the same data, and a new backup of a virtual machine (VM) would favor using the previous version of the same VM rather than some arbitrary VM that happens to have the same files but laid out differently. Thus, the file coloring in a data deduplication operations extends the file coloring to be based on origin and protocol, and provides an implementation outline without modifying the data.

Figure 6:
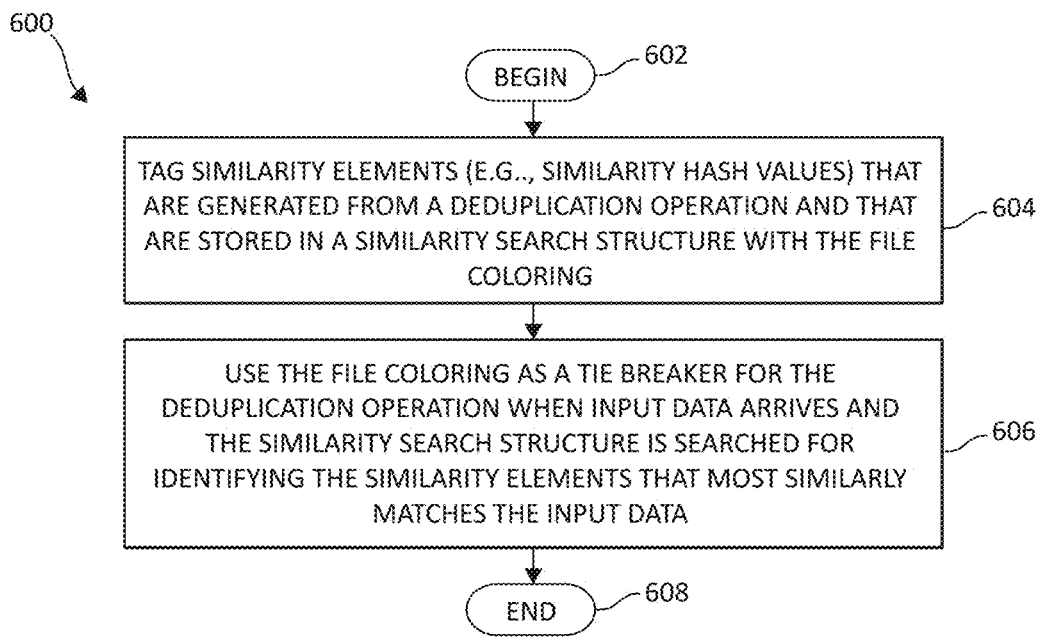
FIG. 6 is a flowchart illustrating an exemplary method for identifying input data in a repository using the file coloring in a data deduplication system in which aspects of the present invention may be realized.

FIG. 6 is a flowchart illustrating an exemplary method 600 for identifying input data in a repository using the file coloring in a data deduplication system in which aspects of the present invention may be realized. The method 600 begins (step 602). The method 600 tags similarity elements (e.g., similarity harsh values) generated from a deduplication operation and that are stored in the similarity search structure with the file coloring (step 604). The method 600 uses the file coloring as a tie breaker for the deduplication operation when input data arrives and the similarity search structure is searched for identifying the similarity elements that most similarly matches the input data (step 606). The method 600 ends (step 608).

At this point, once the colored files are classified together, the similarly classified colored files may have various intensities of the same colored files. The file-coloring operation generally characterizes data (e.g., the painting in the analogy above) according the number of colors used and the intensity (e.g., the brief description of the painting in the analogy above) of those colors for yielding a more robust similarity test system. Thus, these similarly colored files may also include sub-classifications for the various color intensities. The color intensity may be used to determine whether the file color is clustered in a localized region of the data file and/or if the file color is randomly dispersed in the data file (or other distribution pattern. Moreover as illustrated in the following figures, the color intensities may be used for additional classification and grouping of colored files.

Figure 7:
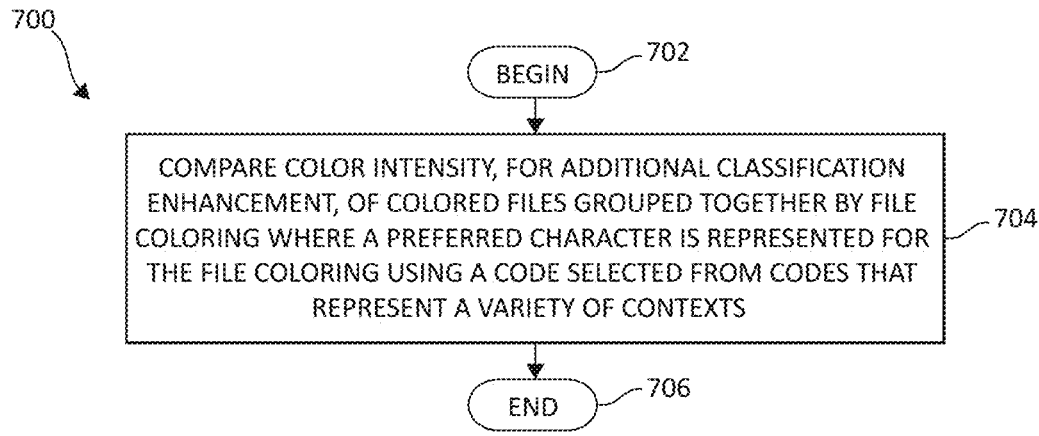
FIG. 7 is a flowchart illustrating an exemplary method for a hybrid of proximity and identity similarity based deduplication in a data deduplication system in which aspects of the present invention may be realized.

Turning now to FIG. 7, a flowchart illustrating an exemplary method 700 for a hybrid of proximity and identity similarity based deduplication in a data deduplication system in which aspects of the present invention may be realized is depicted. The method 700 begins (step 702). The method 700 compares color intensity, for additional classification enhancement, of colored files grouped together by file coloring where a preferred character is represented for the file coloring using a code selected from codes that represent a variety of contexts (step 704). The original meaning of the preferred character is retained when representing the preferred character for the file coloring by the code selected from the plurality of codes. The method 700 ends (step 706).

Figure 8:
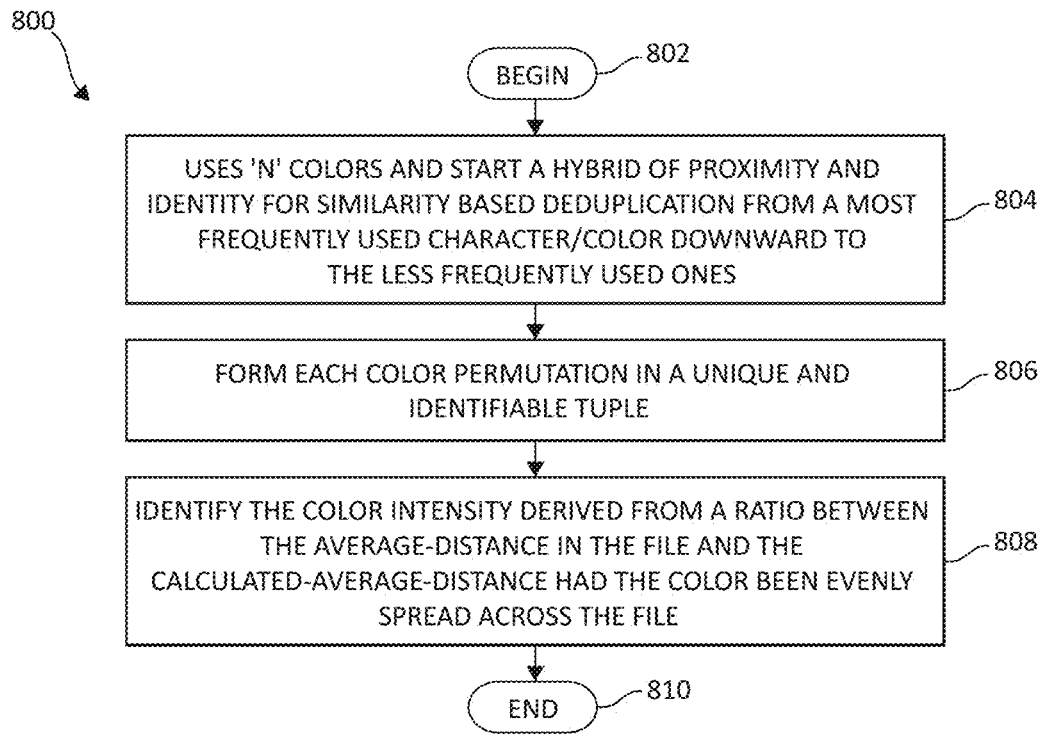
FIG. 8 is a flowchart illustrating an additional exemplary method for a hybrid of proximity and identity similarity based deduplication in a data deduplication system in which aspects of the present invention may be realized.

FIG. 8 is a flowchart illustrating an alternative exemplary method 800 for a hybrid of proximity and identity similarity based deduplication in a data deduplication system in which aspects of the present invention may be realized. The method 800 begins (step 802). The method 800 uses 'n' colors and starts the hybrid of proximity and identity for similarity based deduplication from the most frequently used character/color downward to the less frequently used ones (step 804). The method 800 forms each color permutation (where the order of the file colors order are significant) in a unique and identifiable tuple (step 806). The color permutation may be a colored tree. For example, the tuple may be: color-1, color-2, . . . , and color-n. An another example of the tuple (consisting of the same colors) may be: color-2, color-3, color-1, . . . , and color-m (when the size of the tuple can be the same). The method 800 includes each incoming chunk of data in the appropriate file color permutation (step 808). In other words, each incoming chunk of data may be hung under the data chunk's respective color-tuple-subtree. The method 800 identifies the color intensity derived from a ratio between the average-distance in the file and the calculated-average-distance had the color been evenly spread across the file (step 810). Each data chunk's [unique] data will be the data chunk-size (optionally if data chunk sizes may be different), counters of the data chunk's colors, and then the intensity of those colors as can derived from the ratio between the average-distance in the file and the calculated-average-distance had the color been evenly spread across the file. The method 800 ends (step 812).

It should be noted that the color intensity may hint at whether the color is clustered in small areas (small being defined by a user and/or application) or widely spread across the file. If the calculated-average-distance is significantly larger (e.g., larger by at least more than twenty five percent) than the actual average-distance, it may then be assumed that the color is most likely clustered and not evenly spread. Each incoming block of data and/or data chunk, after being identified by its color group may first be compared against existing chunks, which share the same tuple-type. If all chunks in the primary tuple are found to not be similar, then close tuples (which have same colors but different order) can be checked as well, until all possibilities are exhausted. Stochastic statistics may be used (knowing that on average about 10% of the data changes daily) to order the possible similar tuples, which are based on earlier generations of the respective data (e.g., knowing the incoming counter's values tuples with counters which are about 10% different than those should be checked first.) Though hash collisions are not expected to be a encountered, there is a theoretical risk of data loss if they do happen. Having the HASH hung under the respective tuples allow for same hash to appear more than once (in different groups), without inducing data-loss as they represent different data chunks.

Figure 9:
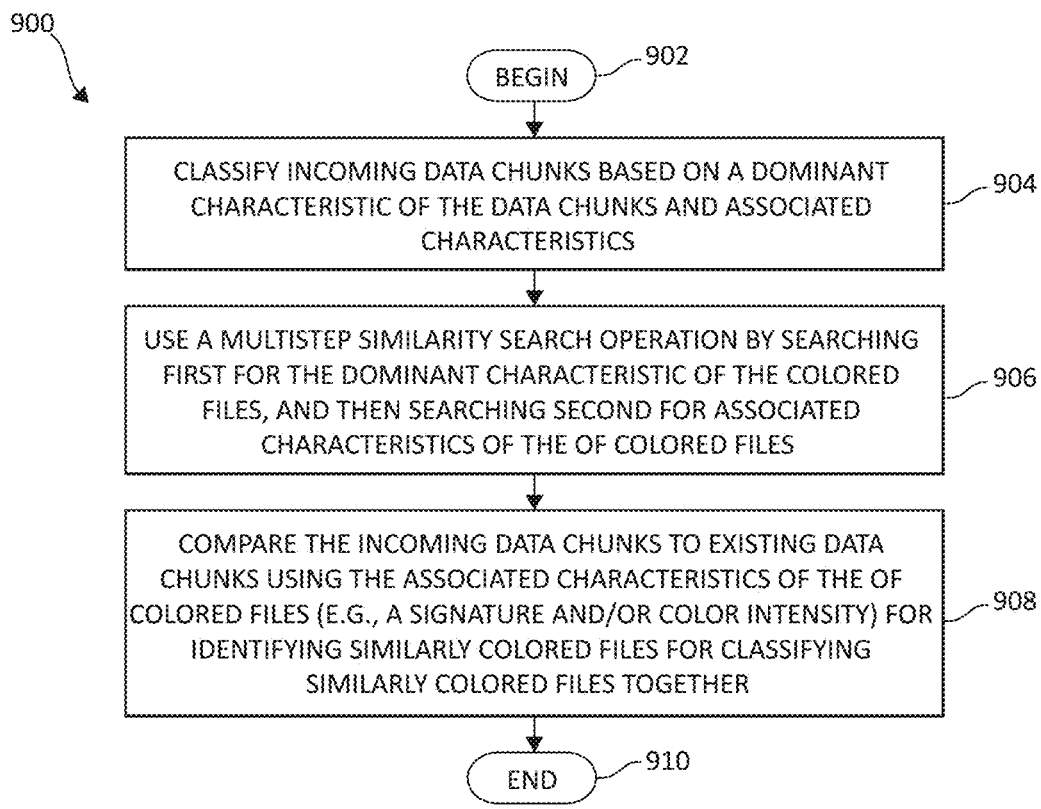
FIG. 9 is a flowchart illustrating an additional exemplary method for a hybrid of proximity and identity similarity based deduplication in a data deduplication system in which aspects of the present invention may be realized.

FIG. 9 is a flowchart illustrating an additional exemplary method 900 for a hybrid of proximity and identity similarity based deduplication in a data deduplication system in which aspects of the present invention may be realized. The method 900 begins (step 902). The method 900 classifies incoming data chunks based on a dominant characteristic of the data chunks (e.g., the file colors) and associated characteristics (e.g., color intensity and distribution of colors) (step 904). In one embodiment, the incoming data chunks are classified first into a file coloring-tree and then the incoming chunk of data may be hung under a data chunk's respective color-tuple-subtree, which provides for an additionally enhanced classification. The dominant characteristic include a dominant color and the associated characteristics include at least one of color intensity and distribution of colors to the colored files. In other words the incoming data chunks is classified based on both a primary file color permutation/tuple (e.g., the type of file color) and secondary file color permutations/tuples (e.g., the color intensity tuple). The method 900 calculates the color intensity of a colored file by measuring a ratio between the actual average distance of a color of the colored file divided by the calculated average distance of the color of the colored file (step 906). The calculated average distance of the colors of the colored assumes the color of the colored file is evenly distributed in the colored file.

The method 900 uses a multistep similarity search operation by searching first for the dominant characteristic of the colored files, and then searching second for associated characteristics of the of colored files (step 906). The method 900 compares the incoming data chunks to existing data chunks using the associated characteristics of the of colored files (e.g., a signature and/or color intensity) for identifying similarly colored files for classifying similarly colored files together (step 908). The order by which the chunks should be compared is two fold. First, vectors of two chunks colors' are compared if the majority of the colors do appear in both chunks. Second, the intensity of the colors that is measured and/or reflected by the ratio between the actual average distance divided by an optimal average is used to compare the nature of the color distribution in the respective chunks. The actual average distance is the actual distance of the colored file from end to end. The optimal average distance is equal to a file size divided by a total number of the file colors that appear within the colored files. The method 900 ends (step 910).

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a hybrid of proximity and identity similarity based deduplication in a data deduplication system using a processor device in a computing environment, comprising:

comparing color intensity for additional classification enhancement of colored files grouped together by file coloring where a preferred character is represented for the file coloring using a code selected from a plurality of codes that represent a plurality of contexts thereby flattening B-TREE indexes when searching for duplicate data within the data deduplication system, wherein an original meaning of the preferred character is retained when representing the preferred character for the file coloring by the code selected from the plurality of codes;

comparing the colored files by comparing vectors of at least two colored files;

using the color intensity for comparing the colored files by measuring a ratio between an actual average distance of the colored file divided by an optimal average distance of the colored file for comparing distribution of colors in data chucks of the colored files, wherein the optimal average distance is equal to a file size divided by a total number of the file colors that appear within the colored files, wherein the color intensity includes a distribution pattern characteristic of the file coloring; and deduplicating the colored files grouped together of a same file coloring and color intensity.

2. The method of claim 1, further including performing at least one of:

using a multistep similarity search operation for searching first for a dominant characteristic of the colored files and searching second for associated characteristics of the of colored files, wherein the dominant characteristic include a dominant color and the associated characteristics include at least one of color intensity and distribution of colors to the colored files, and using a signature for identifying similarly colored files for classifying similarly colored files together.

3. The method of claim 1, further including embedding the file coloring of data chunks in at least one of a plurality of data streams, wherein the file coloring includes at least one of a plurality of shapes, a plurality of colors for one of a plurality of servers, a plurality of file owners, and a plurality of applications.

4. The method of claim 1, further including performing at least one of:

identifying similarities between data chunks of the colored files using the color intensity, and classifying the data chunks having a similar color intensity as similar data chunks.

5. The method of claim 1, further including performing one of:

identifying a file color group in one of a plurality of file color permutations for incoming data chunks, comparing the incoming data chunks to existing data chunks in the one of the plurality of file color permutations, and comparing the incoming data chunks to existing data chunks in the one of the plurality of file color permutations to an alternative one of the plurality of file color permutations if all of the incoming data chunks fail to be substantially similar to the existing data chunks.

6. The method of claim 1, further including calculating the color intensity by measuring a ratio between the actual average distance of a color of the colored file divided by the calculated average distance of the color of the colored file, wherein the calculated average distance of the colors of the colored assumes the color of the colored file is evenly distributed in the colored file.

7. The method of claim 1, further including performing each one of:

setting as the preferred character one of a most used character, a second most used character, and an nth most used character for the file coloring, arranging the colored files according to one of a plurality of first file color permutations, arranging the colored files according to one of a plurality of second file color permutations, classifying incoming data chunks into both the plurality of first file color permutations and the plurality of second file color permutations, and comparing the incoming data chunks to existing data chunks using at least one of the plurality of first file color permutations and the plurality of second file color permutations.

8. The method of claim 1, further including using the color intensity to determine whether the file color is clustered in one of a localized region of the data file and randomly dispersed in the data file, wherein if a calculated-average-distance is larger than the actual average-distance then the color is identified as being clustered in the data file and not evenly spread.

9. A system for a hybrid of proximity and identity similarity based deduplication in a data deduplication system of a computing environment, the system comprising:

the data deduplication system; and at least one processor device operable in the computing environment for controlling the data deduplication system, wherein the at least one processor device:

compares color intensity for additional classification enhancement of colored files grouped together by file coloring where a preferred character is represented for the file coloring using a code selected from a plurality of codes that represent a plurality of contexts thereby flattening B-TREE indexes when searching for duplicate data within the data deduplication system, wherein an original meaning of the preferred character is retained when representing the preferred character for the file coloring by the code selected from the plurality of codes, compares the colored files by comparing vectors of at least two colored files, uses the color intensity for comparing the colored files by measuring a ratio between an actual average distance of the colored file divided by an optimal average distance of the colored file for comparing distribution of colors in data chucks of the colored files, wherein the optimal average distance is equal to a file size divided by a total number of the file colors that appear within the colored files, wherein the color intensity includes a distribution pattern characteristic of the file coloring, and deduplicates the colored files grouped together of a same file coloring and color intensity.

10. The system of claim 9, wherein the at least one processor device performs at least one of:

using a multistep similarity search operation for searching first for a dominant characteristic of the colored files and searching second for associated characteristics of the of colored files, wherein the dominant characteristic include a dominant color and the associated characteristics include at least one of color intensity and distribution of colors to the colored files, using a signature for identifying similarly colored files for classifying similarly colored files together, and embedding the file coloring of data chunks in at least one of a plurality of data streams, wherein the file coloring includes at least one of a plurality of shapes, a plurality of colors for one of a plurality of servers, a plurality of file owners, and a plurality of applications.

11. The system of claim 9, wherein the at least one processor device performs at least one of:

identifying similarities between the data chunks of the colored file using the color intensity, and classifying data chunks having a similar color intensity as similar data chunks.

12. The system of claim 9, wherein the at least one processor device performs at least one of:

identifying a file color group in one of a plurality of file color permutations for incoming data chunks, comparing the incoming data chunks to existing data chunks in the one of the plurality of file color permutations, comparing the incoming data chunks to existing data chunks in the one of the plurality of file color permutations to an alternative one of the plurality of file color permutations if all of the incoming data chunks fail to be substantially similar to the existing data chunks, and calculating the color intensity by measuring a ratio between the actual average distance of a color of the colored file divided by the calculated average distance of the color of the colored file, wherein the calculated average distance of the colors of the colored assumes the color of the colored file is evenly distributed in the colored file.

13. The system of claim 9, wherein the at least one processor device performs each one of:

setting as the preferred character one of a most used character, a second most used character, and an nth most used character for the file coloring, arranging the colored files according to one of a plurality of first file color permutations, arranging the colored files according to one of a plurality of second file color permutations, classifying incoming data chunks into both the plurality of first file color permutations and the plurality of second file color permutations, comparing the incoming data chunks to existing data chunks using at least one of the plurality of first file color permutations and the plurality of second file color permutations, and using the color intensity to determine whether the file color is clustered in one of a localized region of the data file and randomly dispersed in the data file, wherein if a calculated-average-distance is much bigger than the actual average-distance then, the color is most likely clustered and not evenly spread.

14. A computer program product for a hybrid of proximity and identity similarity based deduplication in a data deduplication system using a processor device in a computing environment, the computer program product comprising a non-transitory computer-readable storage medium having computer-readable program code portions stored therein, the computer-readable program code portions comprising:

a first executable portion that:

compares color intensity for additional classification enhancement of colored files grouped together by file coloring where a preferred character is represented for the file coloring using a code selected from a plurality of codes that represent a plurality of contexts thereby flattening B-TREE indexes when searching for duplicate data within the data deduplication system, wherein an original meaning of the preferred character is retained when representing the preferred character for the file coloring by the code selected from the plurality of codes;

compares the colored files by comparing vectors of at least two colored files;

uses the color intensity for comparing the colored files by measuring a ratio between an actual average distance of the colored file divided by an optimal average distance of the colored file for comparing distribution of colors in data chucks of the colored files, wherein the optimal average distance is equal to a file size divided by a total number of the file colors that appear within the colored files, wherein the color intensity includes a distribution pattern characteristic of the file coloring; and deduplicates the colored files grouped together of a same file coloring and color intensity.

15. The computer program product of claim 14, further including a second executable portion that performs at least one of:

using a multistep similarity search operation for searching first for a dominant characteristic of the colored files and searching second for associated characteristics of the of colored files, wherein the dominant characteristic include a dominant color and the associated characteristics include at least one of color intensity and distribution of colors to the colored files, using a signature for identifying similarly colored files for classifying similarly colored files together, embedding the file coloring of data chunks in at least one of a plurality of data streams, wherein the file coloring includes at least one of a plurality of shapes, a plurality of colors for one of a plurality of servers, a plurality of file owners, and a plurality of applications, and.

16. The computer program product of claim 14, further including a second executable portion that performs at least one of:

identifying similarities between the data chunks of the colored file using the color intensity, and classifying data chunks having a similar color intensity as similar data chunks.

17. The computer program product of claim 14, further including a second executable portion that performs at least one of:

identifying a file color group in one of a plurality of file color permutations for incoming data chunks, comparing the incoming data chunks to existing data chunks in the one of the plurality of file color permutations, comparing the incoming data chunks to existing data chunks in the one of the plurality of file color permutations to an alternative one of the plurality of file color permutations if all of the incoming data chunks fail to be substantially similar to the existing data chunks, and calculating the color intensity by measuring a ratio between the actual average distance of a color of the colored file divided by the calculated average distance of the color of the colored file, wherein the calculated average distance of the colors of the colored assumes the color of the colored file is evenly distributed in the colored file.

18. The computer program product of claim 14, further including a second executable portion that performs each one of:

setting as the preferred character one of a most used character, a second most used character, and an nth most used character for the file coloring, arranging the colored files according to one of a plurality of first file color permutations, arranging the colored files according to one of a plurality of second file color permutations, classifying incoming data chunks into both the plurality of first file color permutations and the plurality of second file color permutations, and comparing the incoming data chunks to existing data chunks using at least one of the plurality of first file color permutations and the plurality of second file color permutations.

19. The computer program product of claim 14, further including a second executable portion that uses the color intensity to determine whether the file color is clustered in one of a localized region of the data file and randomly dispersed in the data file, wherein if a calculated-average-distance is much bigger than the actual average-distance then, the color is most likely clustered and not evenly spread.

* * * * *